AUTOMATIC ORTHOPHOTO PRINTER

Filed Oct. 21, 1970 4 Sheets-Sheet 1

INVENTOR
GILBERT L. HOBROUGH
BY Christensen, Sanborn
& Matthews
ATTORNEYS

AUTOMATIC ORTHOPHOTO PRINTER

Filed Oct. 21, 1970 4 Sheets-Sheet 2

INVENTOR
GILBERT L. HOBROUGH
BY Christensen, Sanborn & Matthews
ATTORNEYS

AUTOMATIC ORTHOPHOTO PRINTER

Filed Oct. 21, 1970 4 Sheets-Sheet 3

INVENTOR
GILBERT L. HOBROUGH
BY Christensen, Sanborn & Matthews
ATTORNEYS

INVENTOR
GILBERT L. HOBROUGH
BY Christensen, Sanborn & Matthews
ATTORNEYS

1

3,674,369

AUTOMATIC ORTHOPHOTO PRINTER

Gilbert L. Hobrough, Vancouver, British Columbia, Canada, assignor to Hobrough Limited, Vancouver, British Columbia, Canada Continuation-in-part of applications Ser. No. 760,435, Sept. 18, 1968, Ser. No. 827,428, May 23, 1969, and Ser. No. 67,493, Aug. 27, 1970. This application Oct. 21, 1970, Ser. No. 82,777
Int. Cl. G01c 11/12
U.S. Cl. 356—2 18 Claims

ABSTRACT OF THE DISCLOSURE

This application discloses an improved system which operates automatically to provide an orthophotograph from one or more pairs of stereo aerial photographs. The system disclosed includes first and second television type photo-scanning devices such as vidicons which are operated in synchronism to provide data signals for each spot of the two photographs making up a stereo pair. Correlation networks operate on the data signals to determine the amount of X and Y parallax. Slope limiting circuits in the X parallax system provide smoothing of the height signal and eliminate discontinuities which may exist in the signals being processed. Image transformation circuitry and raster shaping circuits controlled thereby alter the scan patterns of the two vidicons. The problems associated with changes in the elevation of the terrain being mapped are overcome to an extent such that patch printing of a large area is accomplished without the usual discrepancies in alignment of detail in adjacent patches.

This application is a continuation-in-part of my pending U.S. applications Ser. No. 760,435, filed Sept. 18, 1968, titled "Automatic Orthophoto Printer," U.S. Ser. No. 827,428 titled "Digital Parallax Discriminator System," filed May 23, 1969, and of my U.S. application Ser. No. 67,493, filed Aug. 27, 1970, titled "Digital Slope Limiter."

This invention relates to the art of photogrammetry and in particular to the deriving of an orthophotograph from a stereo pair of aerial photographs. The data reduction phase of map making from aerial photographs is generally referred to as photogrammetry, and involves the derivation of terrain dimensions from measuresments taken in the photographs. For purposes of analysis, mapping photogrammetry is subdivided into compilation and aerial triangulation operations. In compilation the topographic and planimetric detail from a single pair of stereo photographs is plotted on a stereo plotting instrument. In aerial triangulation the dimensional relationship between many photographs are related to each other to provide overall dimensional control. This invention relates to the compilation operation and in particular to the plotting of planimetric detail in the form of an orthophotograph.

Since the advent of aerial survey, attempts have been made to utilize the aerial photograph as a direct substitute for a drawn planimetric map. Unfortunately, the finite height of the camera at the point of exposure renders an aerial photograph not truly planimetric owing to the radial displacements in image position introduced by terrain relief. An orthophoto map, that is, an aerial photograph in which such errors are not present, can be produced from a pair of stereo photographs in a stereo plotting instrument specifically designed for this purpose. Orthophotography and the design of manually operated orthophoto printers are described in chapter 17 of the Manual of Photogrammetry published by the American Society of Photogrammetry.

2

Heretofore, stereo plotting of terrain detail, both manual and automatic, has implied a point by point or very small area examination respectively of the model of the terrain surface, with the axes of the left and the right optical systems defining each point or area center. In order to scan the entire model, it is necessary, using this approach, that the reference point, and the optical axes, traverse the model and the photographs synchronously in a systematic manner. The distance between adjacent lines of traverse must be small enough to define all of the detail present in the original photographs. The velocity of traverse is limited by the rapidity with which the reference point can be moved in the Z direction, to accommodate changing elevation of the terrain. The rapidity of Z adjustment is in turn determined by the Z servo characteristics and by the deformation of the plotting instrument structure arising out of inertial forces and the flexibility of the mechanical elements.

A history of the automation of stereo plotting is given in chapter 15 of the Manual of Photogrammetry. The basic automation task is the location of corresponding or homologous points in the stereo images. A plotting instrument may be said to be in registration when the left and the right optical axes or more exactly the scanned areas are intercepting homologous points in the left and right stereo photographs.

In manually operated instruments, such registration error, or parallax as it is called, is sensed and accommodated by the operator's depth perception and the reference point is adjusted in Z manually by the operator until the parallax in the X direction has been reduced to zero. In an automated plotting instrument, small areas of the left and right stereo photographs are scanned by electronic means to derive image or video signals for the left and right photographs. The video signals are then correlated to derive a measure of the misregistration or parallax over the scanned area. During compilation the X parallax sensed in this way produces an error signal that drives a servomotor to change the elevation Z of the reference point in the required direction and error signals to transform the shape of the scanned area to achieve registration over the entire area.

The object of automation is not only to eliminate the tedious sensing of X parallax, but also to speed up the plotting operation as much as possible. Another object of automation is to improve the accuracy of determination of terrain point coordinates. In general, higher plotting speeds are associated with lower accuracy and vice versa.

In prior art orthophoto plotters and printers, the lack of adequate transformation capability has required the area being examined and printed to be exceedingly small, thus slowing the printing process.

A second limitation in such systems, and also deriving from the absence of adequate image transformation capability, is that the correlator in the system operates at reduced efficiency whenever the video signals being processed differ appreciably owing to the relative distortion between left and right views resulting from roughness of terrain.

A third limitation in prior systems is the basic inability to handle Y parallax so that heretofore a conventional vidicon has not been used for deriving data from the photos. Thus in the prior art flying spot scanners have typically been used to derive data from the photos. However, such systems require a short persistence phosphor and generally suffer from the lack of sufficient light being generated. The noise in such systems results in errors as large as the photo variations themselves. The raster has been found to actually burn into the tube so that when transformations are accomplished bright and dark areas are encountered. Finally, such systems operate in the ultra violet region which causes lens problems due to the short wavelengths.

It is a primary object of the present invention to provide a system wherein a vidicon of the conventional television pick-up tube type is used for scanning the photos.

Another object is to provide an orthophoto printing system which includes means for accommodating changes in the roughness of the terrain photographed so that effective and improved patch printing of a large area is possible.

A further object of the present invention is to provide an orthophoto printing system having improved circuitry for altering the raster signals applied to the vidicon type photo scanners.

An additional object of the present invention is to provide an improved raster shaping system for the photo scanners of an orthophoto printing system.

The above and additional advantages are achieved through the use of a system wherein the signals for causing the usual rectangular scan pattern of the photo scanners are altered by a pair of raster shaping networks associated with the photo scanners. A signal correlator is provided which not only determines X and Y parallax from the scanner output signals but also provides a height or $\Delta Z$ signal which is applied to the raster shapers to correct for scale and other distortions which can arise due to nonorthogonal conditions when the pictures being scanned were taken. The system includes a signal analyzer connected between the correlator and the raster shapers, said signal analyzer having the characteristics of a serial circulating memory which is continually updated by the X parallax data. The delay time of the circulating memory is set to correspond to one field period of the scanners and therefore the delayed signal fed back to a summing point at the input of the analyzer represents the $\Delta Z$ signal delayed by one full field period. A closed loop is thus provided which assures a smoothed X parallax signal that is continually augmented with an additional X parallax signal. The net result of the operation is that the $\Delta Z$ signal circulating in the serial circulating memory continues indefinitely and provides the necessary output signal to the raster shapers to maintain the raster information required for zero X parallax during the printing of a given patch.

As described in the above-referred to applications the video signals representing left and right photographic data are converted to digital form and then processed by digital circuitry to determine the existence and degree of parallax between the left and right signals. When the terrain contains discontinuities, noise signals create discontinuities, or the photographs contain blank spots, the signal representing height undergoes a step-function change that is difficult to accommodate. The present system includes slope limiter circuits which provide a smoothing function on the height signals and serve to fill-in discontinuities encountered by the scanning system or generated by noise. This is accomplished by applying the height signals (which are in digital form) to a threshold circuit which serves to detect the existence of a step-function greater than a predetermined amplitude. When such a step-function is recognized, the signal is divided digitally by a selected factor. The signal value resulting from such division is then added to a leading portion of the discontinuity and is substracted from the trailing portion of the discontinuity. Thus the slope limiting is done in a manner which maintains symmetry of the smoothed signal about the original point of discontinuity. The signal is processed in series by a plurality of slope limiters and can also be passed through the system a plurality of times in closed loop operation.

The above as well as additional advantages and objects will be more clearly understood from the following description when read with reference to the accompanying drawings.

Figure 1:
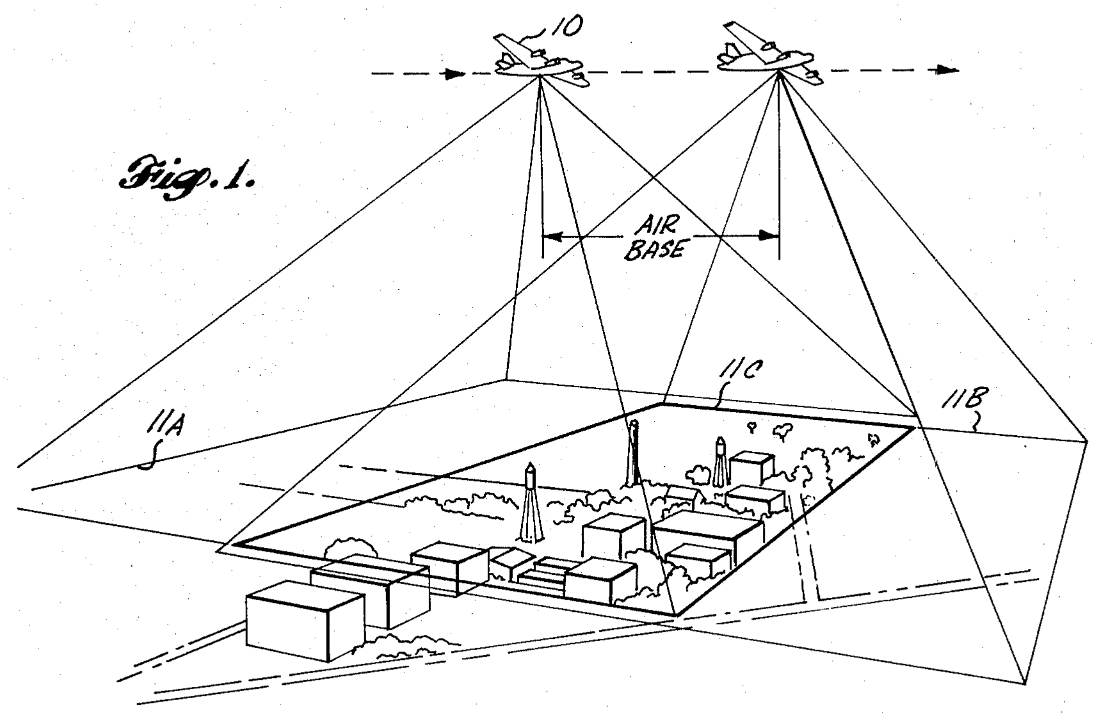
FIG. 1 is a perspective view illustrating an aircraft in flight and the common or overlap area of adjacent photographs.

Turning now to the drawings, and in particular to FIG. 1, an aircraft 10 is shown in two positions taking two photographs 11A and 11B having a common or overlap area 11C. The optical axis of the camera is maintained as nearly vertical as possible during exposure and the aircraft attempts to maintain level flight on a photographic run. A significant dimension is the "air base" or the distance measured along the flight line between adjacent exposure stations.

Figure 2:
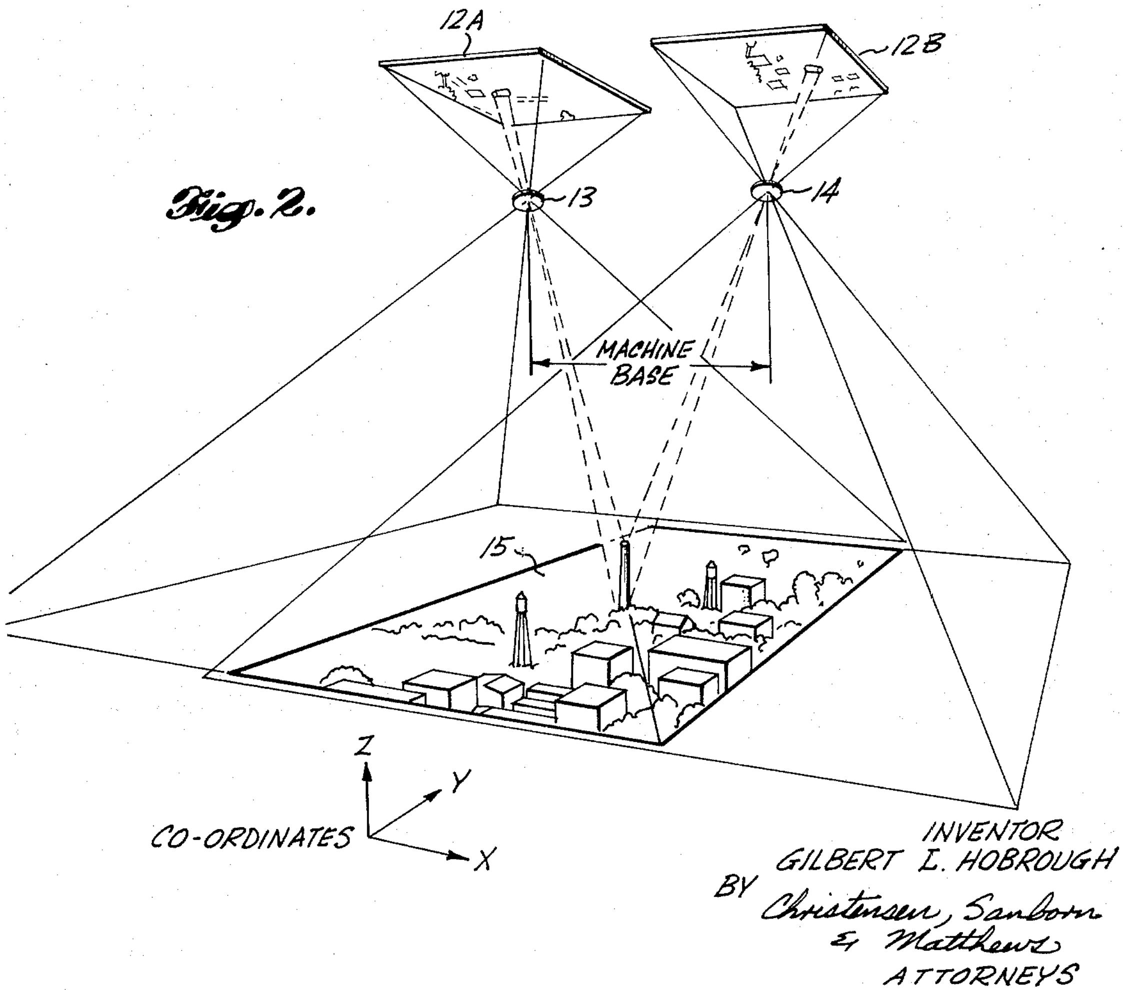
FIG. 2 illustrates the geometry of stereo plotting as provided by a projection type of stereo plotting instrument.

FIG. 2 illustrates the geometry of stereo plotting as provided by a projection type of stereo plotting instrument. The photographic plates (diapositives) 12A and 12B have been printed from adjacent negatives of a roll of aerial survey film. The projection lenses 13 and 14 are positioned, with respect to the diapositives 12A and 12B respectively, in precisely the same relationship that existed between the camera lens and the film. A projection lens and photographic plate holder assembly is called a projector and it can be shown that if the orientation of the projectors in space corresponds to the orientation of the camera in the aircraft at each moment of exposure, then an accurate model of the terrain can be projected into the overlap area 15. The distance between the projection lenses is called machine base and the ratio of the machine base in FIG. 2 to the air base in FIG. 1 determines the scale of the projected model 15.

The optical projection stereo plotting instruments based on the concepts of FIG. 2 are of limited usefulness owing to the conflicting requirements of depth of field and image resolution placed on the optical system. Many stereo plotter designs have been proposed to overcome this difficulty, some involving auto focusing techniques, others employing a mechanical analog system in place of the direct optical analog of the projection instrument. Such plotters are in effect analog computers in which the light rays or mechanical linkages solve the resection equations necessary to recreate a three dimensional model of the terrain photographed from the aircraft. Recently, analytical plotters have been developed in which a digital computer replaces the analog computing elements of the mechanical or optical stereo plotter. The analytical plotter avoids the problems of mechanical precision and allows the use of simple but accurate measuring stages for the stereo photographs. The present invention is disclosed in a system utilizing a digital computing facility in the analytical approach.

Figure 3:
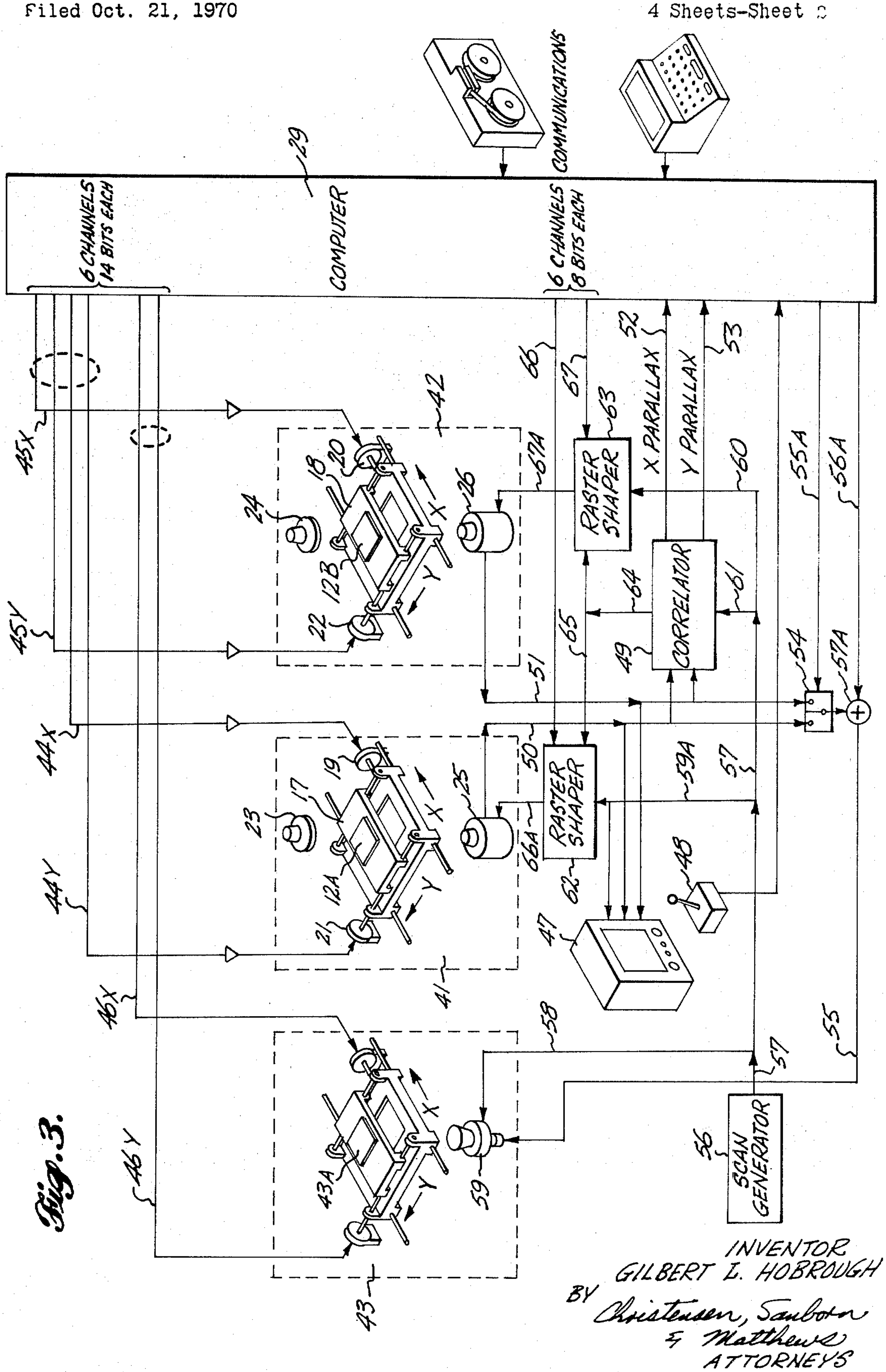
FIG. 3 is a system diagram showing the preferred embodiment of the present invention.

FIG. 3 is a system diagram of the elements of a preferred embodiment of the invention shown as an automated analytical plotter. The diapositives 12A and 12B of FIG. 2 are mounted on the carriages 17 and 18 of the scanner and plate transport assemblies 41 and 42. The plates are adapted for movement in the X and Y directions by the X drive motors 19 and 20 and the Y drive motors 21 and 22. Light sources 23 and 24 illuminate the diapositives and provide light for the scanners 25 and 26 which are shown as conventional TV pickup units typically referred to as vidicons. A scanning printer 43 contains a cathode ray tube 59 and an optical system for printing on sensitive film 43A. A computer 29 which can be any of a number available on the market solves the basic resection equations and delivers stage coordinate commands to the scanners 41 and 42 and to printer 43, on lines 44*x*, 44*y*, 45*x*, 45*y*, and 46*x*, 46*y*, respectively. The electronic stereo viewer 47 enables an operator to observe the images being scanned in a normal stereo manner. A steering control 48 delivers instructions to the computer during manual operations. The electronic correlator 49 generates X and Y parallax error signals in response to timing differences between corresponding elements of the left and right video signals on output lines 50 and 51 from scanners 25 and 26 and also provides a ΔZ signal in the manner described below.

The operation of the system illustrated in FIG. 3 is as follows. First, a sequential program establishes a pair of model coordinates for examination. Stage coordinate signals are delivered to the printer 43 along lines 46, causing the sensitive film in the printer to assume the position corresponding to the selected model coordinate. Second, stage coordinates for the left and right scanners are computed on the basis of an initial or arbitrary terrain height (Z) evaluation and such coordinate signals are delivered on lines 44 and 45 to actuate scanners 25 and 26 respectively. The correlator operates on the left and right video signals, on lines 50 and 51 respectively, to determine the X and Y parallax errors averaged over the scanned area. The resultant X parallax error signal from the correlator is delivered to the computer along line 52 and orders a modification of the initial Z value in a direction that will reduce the X parallax error. The computer re-evaluates the stage coordinates of the scanners on the basis of the new Z value and delivers modified stage coordinates to the left and right scanners on lines 44 and 45 respectively. The correlator continues sensing the video signals from lines 50 and 51 giving a new X parallax signal on line 52 that is delivered to the computer 29. The process of evaluation of X parallax and the determination of the new Z coordinate continues iteratively until the average X error has been reduced to an acceptable level.

An average Y parallax signal on line 53 is also delivered to the computer and is used during setup and orientation of the model to generate new stage coordinates for the scanners in the Y direction. After orientation the Y parallax signal should be zero and during compilation of the model the computer does not respond to Y parallax error signals.

The printer 43 shown in FIG. 3 produces an orthophotograph on sensitive film therein. The cathode ray tube in the printer 43 is scanned synchronously with the cathode ray tubes in the scanners 25 and 26 and one of the video signals from the scanners is used to modulate the light intensity of the scanning spot in the printer. In FIG. 3, the video signal from a left or right scanner is delivered along line 50 or 51 through the scanner selector switch 54 and along line 55 to printer 43. Normally, the left video signal is selected for printing areas towards the left of the model and the right video signal is selected for printing areas towards the right of the model. For this purpose a left/right signal from computer 29 is delivered to selector switch 54 along line 55*a*. The computer also delivers a blanking signal on line 56*a* that is combined in summing circuit 57*a* with the video signal from switch 54. The blanking signal reduces the light output from cathode ray tube 59 to zero except during the desired printing period.

The scan generator 56 produces the deflection waveforms required for scanning the diapositives and sensitive film. The scanning pattern or "raster" is normally square, since conventional TV pickup units are used, but as discussed below the "raster" signals for scanners 25 and 26 are shaped as required for registration. In FIG. 3 the deflection waveforms from scan generator 56 are delivered along lines 57 and 58 to the printing cathode ray tube 59, and via lines 57 and 59*a* to the raster shaper 62 for left scanner camera, and via lines 57 and 60 to the raster shaper 65 for the right scanner camera. Scanning reference signals are delivered via lines 57 and 61 to the correlator 49.

The raster shapers 62 and 63 both receive ΔZ signals from the correlator 49 along lines 64 and 65. Raster shapers 62 and 63 also receive signals from computer 29 along lines 66 and 67 respectively.

The raster shapers 62 and 63 modify the square raster waveforms from the scan generator delivered on lines 59*a* and 60 to produce raster waveforms on lines 66*a* and 67*a* that produce in TV cameras 25 and 26 rasters that are distorted from their normal square shape. By this means the left and right stereo images are transformed in such a manner that the video signals on lines 50 and 51 become more similar, and the image in the scanning printer becomes corrected for scale and other distortions arising out of nonorthogonal conditions when the pictures were taken.

Figures 4, 5:
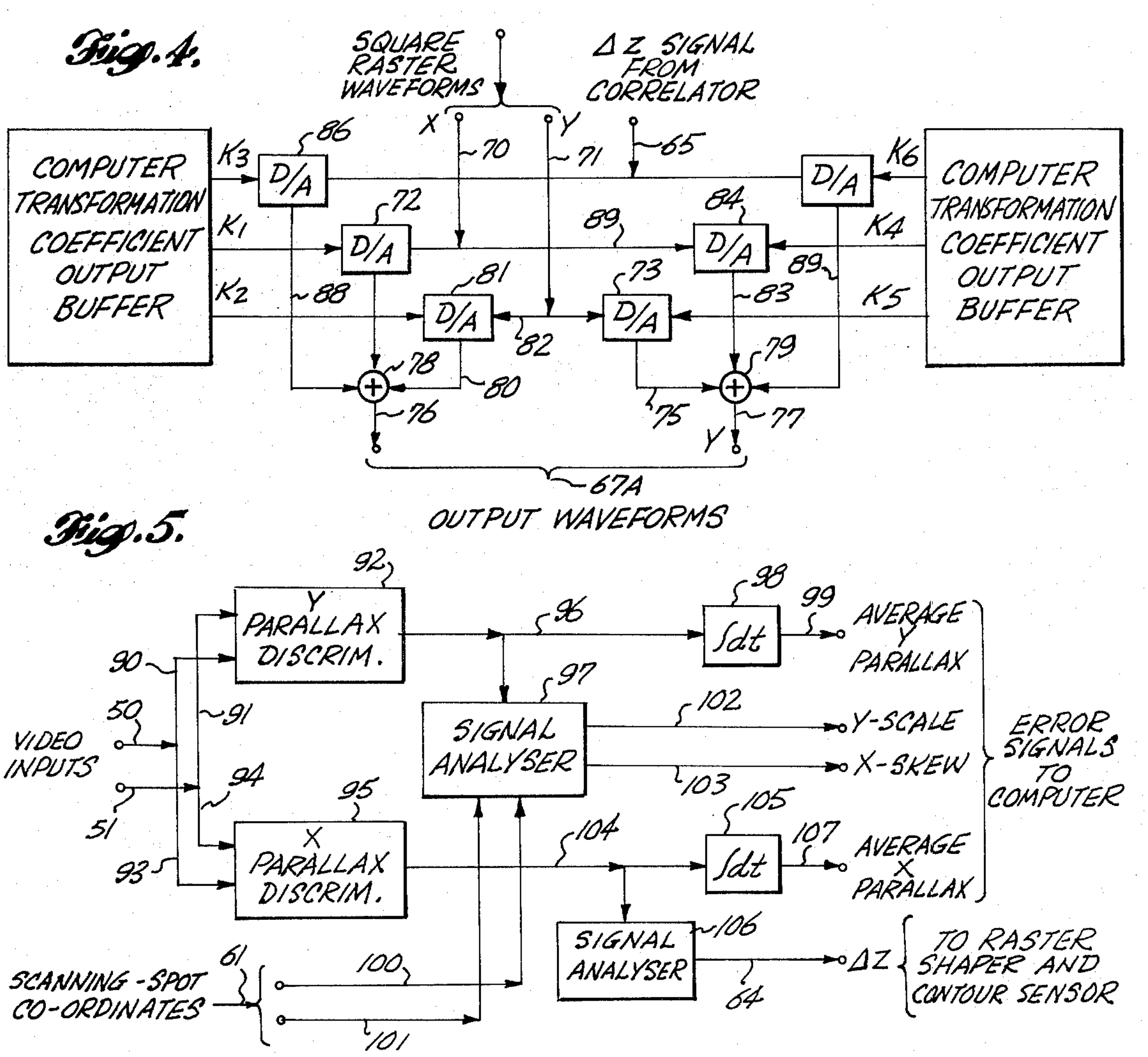
FIG. 4 is a block diagram of the raster shaper used in the system of FIG. 3.
FIG. 5 is a block diagram of the correlator in the system of FIG. 3.

FIG. 4 is a block diagram of a preferred embodiment of the raster shapers 62 and 63 of FIG. 3. It can be seen that the X and Y deflection waveforms for a square raster delivered from the scan generator on lines 70 and 71 respectively are modified by multiplier circuits 72 and 73 respectively to provide deflection signals of different amplitudes on lines 74 and 75. Such signals appear on output lines 76 and 77 after passing through the summing networks 78 and 79 respectively.

It will also be seen that the X and Y waveforms will be modified further by the addition at summing circuits 78 and 79 respectively of other signals as described below. In particular the X output signal will be the resultant of the signal on line 74 already described, and a Y deflection signal delivered to summing point 78 on line 80 from multiplier 81 and line 82. Similarly, the Y output signal will be the resultant of the signal on line 75 already described, and the X deflection signal delivered to summing point 79 on line 83 from multiplier 84 and line 85. The multiplier units can conveniently be conventional digital-to-analog converters and thus are labeled as "D/A" units.

As a result of the action of the elements of the raster shaper so far described, the scale and shape of a raster will be altered in response to computer signals K1, K2, K4 and K5, in FIG. 4, to compensate for the effects of irregularities in the flight line of the survey aircraft and orientation of the cameras at the moment of exposure.

Referring again to FIG. 4 it will be seen that the ΔZ signal from the correlator is controlled in amplitude by multiplier circuits 86 and 87 in response to the computer signals K3 and K6 respectively. A resultant modified Z signal is delivered from multiplier 86 by line 88 through summing circuit 78 and the X output waveform on line 76. Similarly, a resulting modified ΔZ signal is delivered from multiplier 87 by line 89 through summing circuit 79 to the output waveform on line 77.

The ΔZ signal from the correlator represents variation of the terrain height in the model area being scanned and the derivation of the ΔZ signal from the left and right video signals by the correlator will be described below. The multipliers 86 and 87 distribute the ΔZ signal to the X and Y axes of the cameras to accommodate rotational errors in the placing of the diapositives on their stages and other rotational discrepancies arising out of geometrical factors at the moment of exposure.

The computer provides the raster shaping coefficients K1 through K6 for the left and right scanners in addition to the center point coordinates for the stage motors in accordance with techniques which per se are known in the art. The correlator provides a ΔZ signal in addition to the average or "center point" X and Y parallax signals.

FIG. 5 is a block diagram of a preferred embodiment of the correlator for the system. Separate discriminators are used for the detection of X and Y parallax. The input video signals from lines 50 and 51 are delivered via lines 90 and 91 to the Y parallax discriminator 92, and via lines 93 and 94 to the X parallax discriminator 95, one form of parallax discriminator being described in detail in my application Ser. No. 827,428. The Y parallax discriminator delivers a Y parallax signal on line 96 to the signal analyzer 97 and the integrator 98. The integrator 98 delivers a smoothed or average Y parallax error signal on line 99 to the computer. As already described, the computer readjusts the scanner stages in response to the average Y parallax error signal to reduce its magnitude. This action continues until the Y parallax error has been reduced to an immeasurably small value. When the average Y parallax error signal has been effectively reduced to zero, a fluctuating Y parallax signal may be present on line 96 owing to the presence of Y parallax in local areas within the raster. Such local or fluctuating Y parallax signals would arise when the scale or shape of the disapositives differ owing to geometric factors at the moment of exposure. The signal analyzer 97 received the fluctuating Y parallax signal on line 96 and also the scanning spot position coordinate reference signals on lines 100 and 101. The signal analyzer correlates the Y parallax signal on line 96 with the reference signals on lines 100 and 101 to derive the Y scale and X skew error signals on lines 102 and 103 respectively.

The Y parallax error signals on line 99 and the Y scale, and X skew error signals on lines 102 and 103 represent relative distortions between the areas of the diapositive being scanned in the Y direction only. Distortion errors in the X direction are detected by the X parallax discriminator and the signal analyzer to be described. The Y scale signal controls the amplitude of the deflection signal to at least one of the cameras to achieve equality of Y scale in the left and right images. The X skew signal causes a rotation of the raster in at least one of the cameras to achieve a colinearity between the scanning lines of the left and right rasters. During printing, the Y parallax error signals on lines 99, 102, and 103 are very small representing residual errors in the optical systems and TV cameras.

The X parallax discriminator delivers an X parallax signal on line 104 to the integrator 105 and the signal analyzer 106. The integrator 105 delivers a smoothed or average X parallax error signal on line 107 to the computer. The computer adjusts the scanner stages in response to the average X parallax error signal to reduce its magnitude. This action continues until the average X parallax error has been reduced to an immeasurably small value. When the average X parallax has thus been reduced effectively to zero, a fluctuating X parallax error signal will in general remain on line 104 owing to the presence of X parallax in local areas within the raster area. As is the case of the fluctuating Y parallax signal on line 96, already described, a fluctuating X parallax signal on line 104 may arise from geometric factors occurring at the moment of exposure. A more significant source of a fluctuating X parallax signal on line 104 is the variation in X parallax introduced by irregularities in the terrain. Such terrain irregularities are complex, unpredictable, and have presented a difficult problem for solution using prior art techniques. However, the distortion analysis and correction circuitry for their control provided by the present system provides a solution to the problem.

The signal analyzer 106 in FIG. 5 analyzes the fluctuating X parallax signal on line 104 and derives therefrom a ΔZ signal which is provided on line 64. When correlation is complete, the ΔZ signal on line 64 will, when combined with the scanning waveforms in the raster shapers, introduce raster transformations in the cameras 25 and 26 in FIG. 3 that will compensate for the effect of terrain irregularities. It can be shown that complete compensation results in identical video signals on lines 59 and 60, and an orthographic projection of the terrain on the face of the printing cathode ray tube 59 in FIG. 3.

Figure 6:
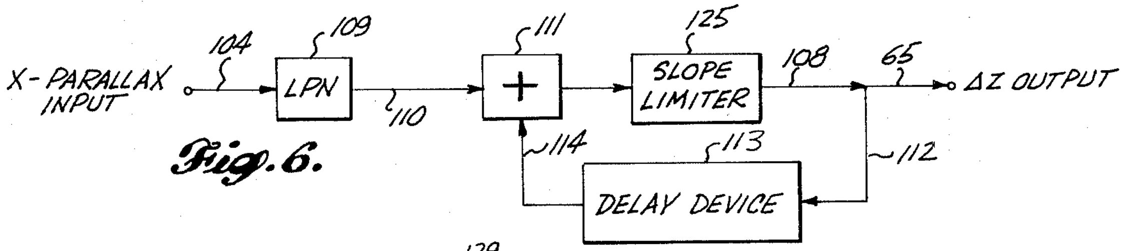
FIG. 6 is a block diagram of the signal analyzer shown in FIG. 5.

A parallel line or TV scanning pattern can be conveniently used in the system of the present invention. The scanning lines run parallel to the X axis of the model so that the X parallax may be detected simply by means of timing differences between the left and right video signals. The raster parameters of primary concern are the size, resolution, and the repetition rate. The product of these factors governs the band width of the video system which is limited by practical considerations to less than 10 megahertz. It can be shown that the size of the raster, or more strictly the number of resolution elements in the raster is limited also by the degree of distortion or transformation that can be applied to accommodate terrain irregularities. As will be shown, the transformation degree that can be achieved with the integrator of FIG. 6 is very high and is not a practical limitation to raster size in the subject invention. The limiting factor or raster size will be the precision with which the scanning rasters can be controlled. I have determined that a square raster containing about one hundred thousand resolution elements (320 x 320) is about optimum, considering the present state of the art. A raster conforming to American TV standards is very close to this and can be used.

The American TV (RETMA) raster parameters referred to are as follows:

Line period=63.5 microseconds
Field period=1/60 second
Single interlace with 2 fields per frame, and thus a frame period=1/30 second
Aspect ratio width/height=3/4.

The ends of the raster can be masked to provide a square format.

Present aerial photographs have a resolution of about 20 line pairs/mm. or 1,600 resolution elements per square millimeter. A 320 x 320 element raster at photo scale would thus be 8 mm. square. Therefore, an 8 mm. square raster can be used for scanning the diapositives, the optical system of the TV cameras being chosen appropriately. Since the overlap or model area of the diapositives is approximately 100 x 220 mm., i.e. 22,000 square mm. total, it will be seen that the TV cameras will scan only a small portion of the overlap at any instant and that 22,000/64 or approximately 350 patches of raster size must be printed to produce a complete orthophotograph of the model area.

Owing to the absence of adequate transformation means in prior art systems for adjusting the scan raster of the scanners, such orthophoto printers have been forced to employ a patch area of less than about 1 square mm. in order to avoid visible discontinuities between adjacent patches. This small patch size has seriously restricted the speed of operation of such instruments. However, using the teachings of the present invention for image transformation, a printing patch size of greater than 8 mm. square at photo scale is made possible, and hence a much higher speed of operation can be obtained than has been possible hitherto.

FIG. 6 is a block diagram illustrating the details of the signal analyzer 106 of FIG. 5. The X parallax signal is delivered from the X parallax discriminator 95 in FIG. 5 (which can be a video correlator such as described in U.S. Pats. 2,967,954; 2,967,642; 2,964,639; 3,145,303 or preferably that of co-pending application Ser. No. 827,428) on line 104 through the low pass network 109 in FIG. 6 along line 110 to the summing circuit 111. The output from the summing point is the ΔZ signal and is delivered to the raster shaper along line 108. The ΔZ signal on line 108 is also delivered to the delay device 113 via line 112. The delay device 113 can be a digital delay line. The resulting delayed $\Delta Z$ signal from delay device 113 is delivered via line 114 to the summing circuit 111.

The output of the X parallax discriminator on line 104 contains spurious signals of high frequency in addition to the X parallax signal. These are removed by the low pass network 109. Additionally, the low pass network averages the X parallax signal over a short period of time thereby smoothing the signals. The average time of the low pass network 109 should be properly selected for the operating characteristics of a given system. A long averaging time increases smoothing and improves the signal/noise ratio in the $\Delta Z$ signal. However, the averaging time determines the size of the terrain elements that can be resolved separately. A long averaging time therefore limits the ability of the analyzer to see high frequency terrain undulations and to introduce compensating transformations of correspondingly high degree. I have found that an averaging time between two and ten video cycle works well for the low pass network 109 in FIG. 6.

The smoothed X parallax signal from low pass network 109 is combined in the summing circuit 111 with delayed signals to be described and the resulting sum signal becomes the $\Delta Z$ signal and is delivered to the raster shapers in FIG. 4 along line 65. The delay device 113 has a delay time of one field period ($\frac{1}{60}$ second) so that the delayed signal on line 114 is the $\Delta Z$ signal delayed by one full field. It is seen that ideally the signal on line 114 should be identical with the signal on line 108 since successive fields should produce nearly identical video and parallax signals. It will be observed that the output of the delay device 113 is connected to the input thereof through summing circuit 111 and lines 108 and 112. As a result of this closed loop or "reverberatory" connection, a smoothed X parallax signal on line 110 will, when once introduced into the reverberatory loop at summing point 111, circulate indefinitely with a circulation period of one frame. Each time the circulating signal passes the summing point it is augmented with an additional smoothed X parallax signal. A parallax signal therefore will increase indefinitely with time so that the components of FIG. 6 can together be considered as a reverberatory or nonsmoothing integrator. Thus a complete matrix of height data for one "patch" to be printed is stored in digital form in the circuit of FIG. 6, with this information being continuously circulated and updated during each scan of the patch.

Figure 8:
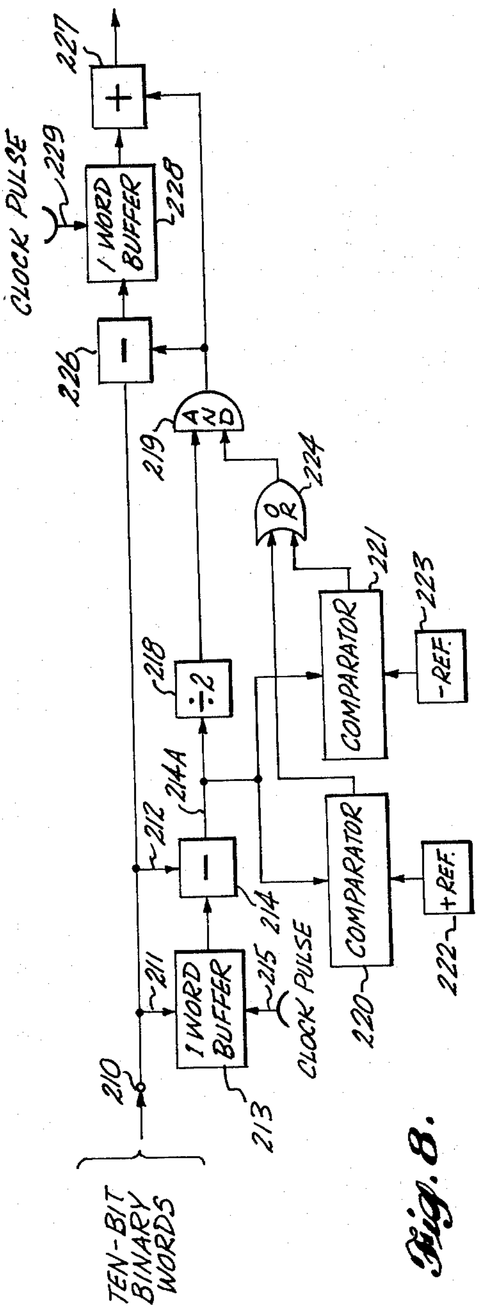
FIG. 8 is a block diagram teaching the concepts for a slope limiter such as included in FIGS. 6 and 7.

The system thus far described corresponds in general to that of my above-identified application Ser. No. 760,435. However, as seen in FIG. 6 the present system includes a slope limiter circuit 125 which preferably is of the type shown in my pending application Ser. No. 67,493, filed Aug. 27, 1970. FIG. 8 of this application corresponds to FIG. 1 of that application and will now be described.

The slope limiter in FIG. 8 is adapted for processing digital information signals identified as "words." The words are received in serial sequence. For purposes of illustration, the input signal information is shown as words of ten-bit parallel binary data plus one bit which is used to identify the algebraic sign of the value. The sign bit is carried through the slope limiter, as will be described below. The words are derived from the left and right video information signals in the manner described above.

The input signals are applied to the input circuit 210 and from thence via circuits 211 and 212 to the one word buffer unit 213 and to the subtraction circuit 214. The buffer unit 213 is clocked at the system clock rate by clock pulse signals on clock terminal 215. The one word buffer 213 comprises ten binary signal storage devices such as bistable circuits connected in parallel for the receipt and storage of individual bits making up a word plus one section for sign bit.

Figure 8A:
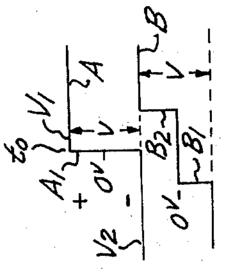
FIG. 8A is a waveform diagram for FIG. 8.

The subtraction circuit 214 performs a subtraction operation between an input word on line 210 and the word which existed on line 210 prior to the occurrence of the preceding clock pulse and presently stored in buffer 213. In FIG. 8A the voltage "V" corresponding to the difference between voltages $V_1$ and $V_2$ would be represented by the digital signal on the subtraction output circuit 214A The input signal "A" of FIG. 8A is shown as having undergone a change which is of sufficient magnitude to render the slope limiting circuit operable.

The difference signal obtained from subtraction circuit 14 is applied to the digital division circuit 218 where it is divided by a divisor of two. The output signal from division circuit 218 serves as one of the input signals to AND circuit 219.

The other input signal required to open the AND circuit 219 is present only when the absolute value of the signal from subtraction circuit 214 exceeds a predetermined magnitude. The output circuit 214A of subtract circuit 214 is applied to the comparator circuits 220 and 221 which respectively have the plus and minus reference values applied thereto by the reference sources 222 and 223. The reference sources 222 and 223 provide binary signals to the binary comparator circuits 220 and 221. These values from the reference sources 222 and 223 represent in digital form the value of the voltages which must be exceeded in order to cause slope limiting to occur. When this predetermined magnitude is detected, the AND gate 219 receives a signal via the OR gate 224. The AND gate then is opened so that one half of the value of the signal provided by subtract circuit 214 is applied to subtract circuit 226 and to the add circuit 227. Circuits 226 and 227 will be seen to be connected respectively to the input and output circuits of the word buffer 228. The subtract circuit 226 is also directly connected to the input terminal 210.

It will be seen that the circuitry of FIG. 8 described thus far acts to subtract from an existing word the value of a preceding word, to divide the difference by two, and then add and subtract one half of the difference to the leading and trailing sides of the step change in input signal value. It should be noted that the addition and subtraction of signals includes algebraic sign so that in the case of a step-function decrease in the input signals applied to terminal 210 the add circuit 227 would be adding a negative quantity obtained from division circuit 218. It is also of importance to note that the adding and subtracting is done in a symmetrical manner. In the exemplary waveform A of FIG. 8A the input signal has undergone a voltage increase. The waveform B in FIG. 8A represents the output signal on the output terminal 229. It will be seen that output signal has two steps with the amplitude of each step $B_1$ and $B_2$ being one-half of the amplitude of the step $A_1$ of the input signal. It will be seen that the steps $B_1$ and $B_2$ are symmetrically located relative to the step $A_1$.

The slope limiter concept described above serves to smooth the signal large step-function signal by converting it to a plurality of smaller steps, and as described in my above-identified "Digital Slope Limiter" patent application, a number of stages can be connected in tandem. I have found in practice that it is advantageous to provide such a tandem arrangement, as for example as shown in FIG. 4 of that application. It is also advantageous to carry more bits following the initial division than there exists in the initial input word and then drop the excess bits when output signals are actually used. Thus a truncating arrangement can be provided to get rid of the factors which can arise from the division process.

Figure 7:
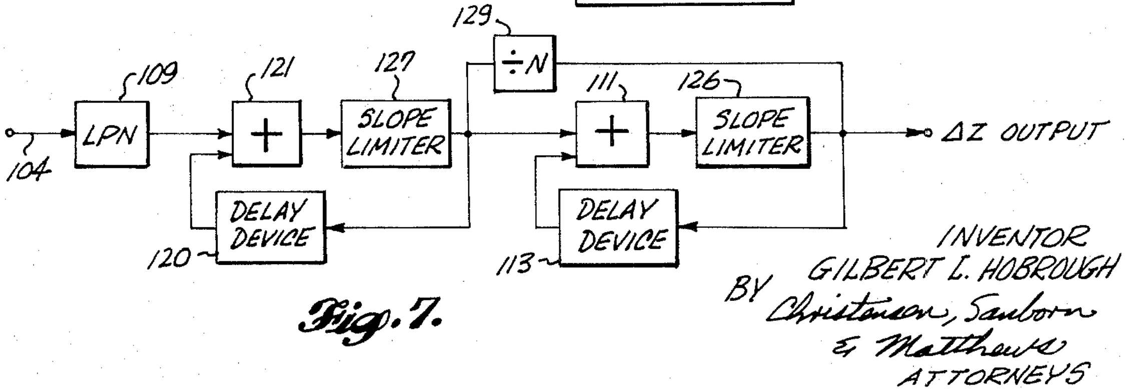
FIG. 7 is a block diagram of a signal analyzer similar to that of FIG. 6 but including an additional closed loop signal circulating unit.

An additional signal circulating memory unit can be connected in cascade with the above-described circulating memory unit of FIG. 6 to further improve system operation. This is seen in FIG. 7 wherein the additional circulating memory unit including delay line 120 and the summing circuit 121 is between the low pass network 109 and the summing circuit 111. The circulation period for the additional circulating memory unit 120 is set to the line period of the scanning raster. This would be 63.5 micro-seconds for a system based on the American TV standards mentioned above. A "divide by N" circuit 129 is also preferably included to avoid oscillation or instability. A divisor of two would typically be used.

The ΔZ signal on line 108 is delivered via line 65 to the raster shapers in FIG. 3, where raster transformations are produced as already described. When the raster transformation is complete, the video signals on lines 50 and 51 in FIG. 3 will be identical and the X parallax signal on line 104 will fall to zero. Once this occurs the ΔZ signal circulating in the delay device 113 will continue indefinitely, delivering to the raster shapers of FIG. 3 the necessary data to maintain the raster information required for zero X parallax. It will be seen that in FIG. 7 two slope limiter circuits 126 and 127 are included to perform the functions described above in connection with FIG. 6 for each of the circulating memories.

From the above it will be seen that the digital signals representing height data (ΔZ) for a complete 8 mm. square patch are circulated in the Gestalt memory system of FIG. 6. As the signals circulate they are simultaneously applied to the scan generators for the vidicons in the photo scanning section to alter the scan and reduce parallax. During this time the printer is not operating. This procedure continues until the system has removed substantially all of the X parallax (the Y parallax having been removed by signals applied to the drive motors for positioning the photos). Then at this time the print system becomes operable and signals circulating in the Gestalt memory serve to control the scan generators for pickup vidicons. Although the printing cathode ray tube 59 is then operable for the printing of an 8 mm. square patch, it will be seen that the scan pattern for the printing cathode ray tube is an undistorted square raster. As the photos are scanned by the vidicons the beam of the printing cathode ray tube is intensity modulated by one or the other of the vidicons as controlled by selection unit 54. Following the printing of a complete patch the stage coordinate signals for the transport assemblies 41 and 42 are changed for scanning of the next patch, and simultaneously the sensitized film in the printer 43 is positioned relative to the printing cathode ray tube 59 for printing of the next patch. In this manner a complete orthophotograph is printed, such orthophotograph being composed of the separate patches.

Thus it will be seen that the system operates to scan a complete area (referred to as a patch) of the photographs and generate the necessary signals for removing the parallax for the complete patch, these digital signals for a complete patch being stored as an accessible matrix of ΔZ signals in the circulating memory section. The circulating ΔZ signals then provide the necessary control during the printing cycle to permit printing of a complete patch.

There has been disclosed an improved automatic orthophoto printer which produces an orthophotograph from a pair of stereo aerial photographs or in a manner such that problems heretofore encountered in the art are avoided. In particular the system of the present invention includes image transformation circuitry and utilizes slope limiters in the serial circulating memory section. The system has been disclosed as including the presently preferred embodiment, with novel raster shaping circuits and a novel signal correlator being included in the system. It will of course be understood to those skilled in the art that various changes and modifications can be made in the system without departing from the inventive concepts. For example, a deflectible laser system could be used as the photograph scanning means, and also as the printing means in place of vidicons, flying spot scanners and cathode ray tube devices.

What is claimed is:

1. An orthophoto printing system comprising in combination: photo positioning means for holding first and second photographs making up a stereo pair; vidicon means including first and second vidicons aligned with said photographs and each including raster signal means for controlling the scanning of a selected patch on each photograph, each patch being an area of the photograph covered in one complete scan cycle with the span pattern for each scan cycle being a plurality of adjacent parallel scan lines; printing means including cathode ray tube means and means holding a segment of sensitized film in alignment with said tube means, said tube means including means providing a beam pattern corresponding to the undisturbed scan pattern of one of said vidicons for the exposure of a patch of film made up of a plurality of adjacent lines; means connecting said cathode ray tube means with said vidicon means to render said cathode ray tube means under the control of signal information derived from said vidicon means; signal correlating means coupled with said vidicon means and operable to derive error signals proportional to the timing differences between homologous components of the video signals provided by said vidicons; means connecting said correlating means to said raster signal means and responsive to said error signals to alter the scan pattern for at least one of said vidicons; and signal memory means connected between said correlating means and said raster signal means for storing the error signals derived from a complete area being scannned by said vidicon means, said signal storage means providing output signals to control the alteration of the raster of said vidicon means during the operation of said cathode ray tube means with the beam deflection pattern for said cathode ray tube means remaining the same as an undisturbed scan pattern of one of said vidicons.

2. The system of claim 1 wherein said signal storage means comprises a closed loop serial circulating memory.

3. An orthophoto printing system comprising in combination; photo positioning means for holding first and second photographs making up a stereo pair; a photo scanning system including first and second scanning means aligned with said photographs and each providing an output signal; printing means including light generating means and film transport means for holding a segment of sensitized film in alignment with the light generating means; raster signal means for each of said scanning means providing each of said scanning means with a scan pattern composed of a plurality of adjacent scan lines defining a scan cycle which causes the scanning of a selected patch made up of a plurality of scan lines during each complete scan cycle; parallax detection circuit means coupled with each of said scanning means and with said raster signal means and operative to distort the scan pattern of at least one of said scanning means in response to the detection of parallax, the distortion of the scan pattern being in a direction to reduce the parallax; and means connecting said printing means to said scanning means to render the intensity of the light generated by said printing means under the control of signals from one of said scanning means with the light from said light generating means being moved in a pattern corresponding to an undistorted scan pattern of one of said scanning means.

4. The apparatus of claim 3 including parallax signal storage means having an input circuit coupled with said parallax detection circuit means and an output circuit coupled with the input circuit of the storage means and with said raster signal means, said signal storage means being operative to store the parallax signals generated during at least one complete scan cycle.

5. The apparatus of claim 4 wherein said signal storage means comprises a circulating memory system having a circulation period corresponding to at least one complete scan cycle.

6. The apparatus according to claim 4 including slope limiting circuit means connected to said signal storage means.

7. The apparatus of claim 3 including signal delay means coupled with said scanning means and having means for adding to a parallax signal for a given portion of the area being scanned by said scanning means a signal representing the parallax for that same portion of the area scanned during a previous scan cycle.

8. The apparatus of claim 7 including slope limiting circuit means coupled with said signal delay means.

9. The apparatus of claim 8 wherein said slope limiting circuit means is connected to the input circuit of said signal delay means.

10. The apparatus of claim 9 wherein said each of said scanning means comprises vidicon means and said slope limiting circuit means includes means for dividing input signals of a predetermined amplitude into a plurality of signals of smaller amplitude with the sum of the signal values for said plurality of smaller signals being equal to the value of the original signal.

11. The apparatus of claim 10 including video-to-digital signal conversion means connected to said vidicon means and to said parallax detection circuit means, and wherein said signal delay means and said slope limiting circuit means comprise a digital delay line and a digital slope limiting circuit, respectively.

12. An automatic orthophoto printing system comprising in combination: stereo photograph scanning means including scanning raster control means providing first and second video signals; signal correlator means coupled to said scanning means to derive digital parallax error signals from the video signals; means applying the error signals to said scanning raster control means to perturb the scan pattern of at least one of the photographs in a direction to reduce the error signal; a printer connected to said scanning means and controlled thereby; digital signal storage means connected to said correlator means and operative to store the error signals corresponding to an area of the photographs defined by a plurality of adjacent lines scanned by said scanning means; said storage means having storage locations corresponding to portions of said area being scanned; signal adding circuit means connected to said scanning means and to said storage means for adding the signals in said storage means resulting from a first scan cycle of said area by said scanning means and corresponding to a given portion of said area to the error signals from said correlator means corresponding to the same portion of said area but resulting from a subsequent scan of the same area by said scanning means.

13. The system of claim 12 wherein said printer includes a cathode ray tube and record support means positioning a piece of record material in alignment therewith, said cathode ray tube being intensity modulated by signals from said scanning means with the beam of said tube being deflected in a pattern corresponding to the unperturbed scan pattern of said scanning means.

14. The system of claim 12 including slope limiting circuit means connected to said signal adding circuit means.

15. The system of claim 14 wherein said slope limiting circuit means includes means responsive to a signal of a value greater than a predetermined value to generate a plurality of signals each of a value less than the original signal value with said plurality being symmetrically located in time relative to the time of occurrence of said signal.

16. The system of claim 13 wherein said record support means remains stationary during the recording of data representing an area defined by a plurality of adjacent lines traversed by the beam of said tube.

17. In an automatic orthophoto display system having electronic photograph scanning means operable to provide first and second video signals from first and second photographs of a stereographic pair, display means connected to said scanning means and controlled by one of said signals, scanning raster generation means coupled with said scanning means and with said display means and providing raster deflection signals thereto, signal correlating means coupled with said scanning means and operable to derive an error signal proportional to the timing differences between homologous components of said first and second video signals, and raster shaping means coupled to said correlating means and to said scanning means and responsive to said error signal to perturb the scan pattern for the derivation of at least one of said video signals, the improvement comprising slope limiting circuit means connected to said correlating means and operative to convert an error signal of a magnitude greater than a predetermined value into a plurality of signals of lesser value which symmetrically lead and lag the original error signal.

18. The apparatus of claim 17 wherein said slope limiting circuit means includes signal dividing circuit means operable to divide an error signal into a plurality of digital signals with the sum of the values of the digital signals corresponding to the digital value of the error signal.

References Cited

UNITED STATES PATENTS 3,566,139 2/1971 Hardy et al. .......... 356—2 X

RONALD L. WIBERT, Primary Examiner

F. L. EVANS, Assistant Examiner

U.S. Cl. X.R.

250—220 SP